United States Patent [19]
Muirhead et al.

[11] 3,873,645
[45] Mar. 25, 1975

[54] ANTISTATIC POLYSTYRENE

[76] Inventors: Leslie A. Muirhead, 9 Eden Close, Wilmslow; William P. Millrine, 18 Romsey Dr., Cheadlehulme, both of England

[22] Filed: Jan. 9, 1973

[21] Appl. No.: 322,258

[30] Foreign Application Priority Data
Jan. 14, 1972 United Kingdom .............. 1878/72

[52] U.S. Cl. .......... 260/879, 260/880 B, 260/876 B
[51] Int. Cl. ............................................. C08f 15/00
[58] Field of Search ............ 260/876 B, 880 B, 894, 260/879

[56] References Cited
UNITED STATES PATENTS

| | | | |
|---|---|---|---|
| 3,376,277 | 4/1966 | Selfert et al. ..................... | 260/85.5 |
| 3,499,059 | 3/1970 | Molau et al. .................... | 260/876 B |
| 3,562,204 | 2/1971 | Van Breen .................. | 260/880 B X |
| 3,644,310 | 2/1972 | Hopkins .......................... | 260/80.78 |

*Primary Examiner*—William F. Hamrock

[57] ABSTRACT

Antistatic polystyrene compositions suitable for being thermoformed into articles having antistatic properties comprise blends of a polymer of a monovinyl aromatic hydrocarbon, certain elastomeric block copolymers and a compatible antistatic agent.

5 Claims, No Drawings

ANTISTATIC POLYSTYRENE

BACKGROUND OF THE INVENTION

This invention relates to antistatic polystyrene compositions and more particularly to antistatic rubber-toughened polystyrene compositions.

It is well known that polymerized vinyl aromatic compositions may be toughened, i.e. improved in their resistance to shock by incorporating a small amount of elastomer, for example, by blending or by polymerizing the vinyl aromatic compound in the presence of a small amount of elastomer. From Belgian Patent No. 677,455, it is known to produce high impact resistant vinyl aromatic compositions by blending a small amount of certain block copolymers of vinyl aromatic compounds and conjugated dienes with interpolymers prepared by graft polymerizing a vinyl or vinylidene compound in the presence of a dissolved elastomer.

Hitherto it has been very difficult to produce antistatic articles by thermoforming sheet which has been extruded from toughened polystyrene compositions because antistatic agents added to the compositions tend to become ineffective during sheet extrusion and subsequent thermoforming operations. Thermoforming refers to the process of forcing heat-softened sheet plastic against a mold by mechanical, air or vacuum pressure; the plastic, when held to the shape of the mold and allowed to cool, retains the shape and detail of the mold. The process is more fully described, e.g. in *Modern Plastics Encyclopedia*, 1968, pp. 812–823.

A major market for toughened polystyrene compositions is in the field of food containers and similar articles. Since the market demands that these articles be antistatic, various proposals have been made to get round the problem. One such proposal involves treatment of the thermoformed article with a coating of an antistat, but this is an additional process step and is therefore generally undesirable.

Thus at present many food containers and similar articles are produced by injection molding toughened polystyrene compositions because in the injection molding operation, the antistat, or an acceptable amount thereof, remains effective in the injection molded article. However, the injection molding route is not so attractive because it is more expensive than the thermoforming route.

SUMMARY OF THE INVENTION

According to the invention a toughened polystyrene composition has been found which will retain its antistatic properties after extrusion into sheet and subsequent thermoforming of the sheet into articles.

The present invention provides a toughened polystyrene composition comprising
a. at least one of a polystyrene homopolymer, a toughened polystyrene obtained by polymerizing a styrene monomer in the presence of an elastomer;
b. a rubbery block copolymer; and
c. a compatible antistatic agent.

It has been found that the presence of the rubbery block copolymer has an unexpected effect on toughened polystyrene compositions in that the antistatic agent is retained by the composition after extrusion into sheet and after thermoforming into articles. Further, the presence of the rubbery block copolymer gives the composition excellent high impact properties and at the same time the melt flow characteristics are not deleteriously affected. The invention further provides a process for the preparation of the other toughened polystyrene composition according to the invention, and a process for the preparation of an antistatic thermoformed article.

DESCRIPTION OF PREFERRED EMBODIMENTS

The antistatic agent may be present over a wide concentration range but generally concentrations in the range 0.2 to 5.0% by weight of the total compositions are suitable. For many applications a concentration in the range 0.5 to 2.0% by weight is perfectly satisfactory. The antistatic agent may be any agent which is compatible with the toughened polystyrene composition. Particularly useful agents are the long chain aliphatic acid amides or their alkylene oxide derivatives, for example $C_{8-20}$ aliphatic acid amides, or their derivatives prepared from lower alkylene oxides and preferably $C_{10}$–$C_{18}$ aliphatic acid amides or ethylene oxide derivatives. Exemplary are capric dipropanol amide, myristic amide and a stearic diethanol amide. An especially useful example is lauric diethanol amide having the formula $C_{11}H_{23}CON(C_2H_5OH)_2$.

The rubbery block copolymer preferably is one of the following general formulae:

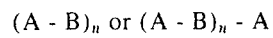

$$(A - B)_n \text{ or } (A - B)_n - A$$

in which A and B signify polymeric blocks and $n$ signifies a positive integer from 1 to 6. Block A comprises a polymerized vinyl aromatic hydrocarbon and Block B comprises a polymerized conjugated $C_4$–$C_6$ alkadiene. Preferably each Block A has an average molecular weight from about 5,000 to about 40,000 and most preferably from about 7,500 to about 15,000; Block B has an average molecular weight from about 30,000 and 200,000 and most preferably from about 50,000 to about 150,000. Block copolymers which are particularly suitable are those in which the blocks A constitute from about 8 to 33% by weight of the block copolymer and most suitably from abouot 10 to about 25%. Processes for preparing such block copolymers are well known and are described for example in U.S. Pat. Nos. 3,149,182 to Porter, 3,231,635 to Holden et al. and 3,599,452 to De La Mare et al. Commercially available block copolymers usually have 2 or 3 blocks in A-B or A-B-A configuration; for example, styrene-butadiene or styrene-butadiene-styrene block copolymers, and copolymers of this type give excellent results in compositions according to the present invention. Although the amount of elastomeric block copolymer in the composition may vary between wide limits it is preferred to use an amount in the range 5–40% by weight of the total composition; for example, an amount in the range 10–20% by weight of the total composition. In accordance with the ASTM definition an elastomer herein refers to a substance that can be stretched at room temperature to at least twice its original length and after having been stretched and the stress removed, returns with force to approximately its original length in a short time.

The toughened polystyrene with which the block copolymer and antistatic agent may be blended to form a composition according to the invention is produced by polymerizing a styrene monomer in the presence of an elastomer, e.g. a polybutadiene having a cis 1,4 content above about 35% styrene-butadiene rubber and the like, which elastomer is normally present to the extent of about 5 to 20% by weight of the toughened polystyrene component. It may be produced by any one of the polymerization methods known for the production of toughened polystyrene, e.g. bulk, solution, suspension or bulk-suspension, wherein prepolymerization of the styrene monomer and elastomer up to and including phase inversion followed by the so-called "finishing step" involving the completion of the polymerization in suspension. Other methods may, however, be used. Lubricants, for example, butyl stearate or mineral white oil, may also be present during inter-polymerization of the styrene and the elastomer, and particular advantages accrue when petroleum jelly is used as lubricant. The lubricants may be used at levels in the range 5–20% by weight of the toughened polystyrene; conventional levels of lubricant in the range 5–10% by weight may be used but high levels such as in the range 10–20% by weight give particularly good flow characteristics to the toughened polystyrene compositions according to the invention, especially in the case of petroleum jelly.

The toughened polystyrene may be present in the composition according to the invention in concentrations in the range 20–95% by weight of the total composition. It is preferred to employ a mixture of homopolystyrene and toughened polystyrene where the combined content of homopolystyrene and toughened polystyrene present in the composition in the range 20–95% by weight of the total composition. The weight ratio of the toughened polystyrene to the homopolystyrene may be between 90:10 and 10:90, preferably between 75:25 and 25:75. Very useful weight ratios have been found in the range 25:75 to 50:50.

Although it is preferred to have a toughened polystyrene present in the composition according to the invention, it is not an essential requirement and compositions comprising homopolystyrene, rubbery block copolymer and an antistatic agent are useful in some applications.

The components of the composition according to the invention may be blended together by any convenient means, for example in a Banbury mixer followed by further blending on a roller mill or in an extruder, the blending being carried out at an appropriate temperature to achieve the required intimate mixing as will be well known to those in the art. The rubbery block copolymer may be blended with the other components in an uncompounded form but it may also be added in the form of a compound with a lubricant e.g. a mineral white oil. The amount of lubricant compounded with the rubber may lie in the range from about 5 to 30% weight of the rubber. A number of commercially available block copolymers already contain a proportion of lubricant and thus it may not be necessary to add additional lubricant.

According to an aspect of the invention, there is provided a process for the preparation of the toughened polystyrene composition according to the invention which comprises blending together
a. at least one of a polystyrene homopolymer, or a toughened polystyrene obtained by polymerizing a styrene monomer in the presence of an elastomer,
b. a rubbery block copolymer; and
c. a compatible antistatic agent.

It is desirable to avoid cross-linking the rubbery block copolymer in order to preserve the unique properties it gives to the compositions according to the invention and thus the blending of the components together should be carried out at the lowest possible temperature. Furthermore it is preferable to add at least one anti-oxidant, e.g. 2,6-di-tert-butyl 4-methyl phenol (commercially available as Ionol CP) or octadecyl 3-(3,5-di-tert-butyl-4-hydroxyphenyl) propionate (commercially available as Irganox 1076), so that cross-linking of the block copolymer is largely prevented.

As has been stated above the compositions according to the invention possess the property of retaining their antistatic characteristics after undergoing extrusion into sheet and subsequent thermoforming into articles. Accordingly, the present invention provides a process for the preparation of an antistatic toughened polystyrene sheet which comprises extruding the composition according to the invention through a sheet-forming die.

The present invention further provides a process for the preparation of an antistatic thermoformed article which comprises thermoforming a toughened polystyrene sheet into an article wherein the sheet is made from a composition according to the invention.

The terms "styrene" and "polystyrene" as used throughout this specification include not only styrene and polystyrene themselves but also the nuclearly substituted and side chain substituted styrene derivatives and the polymers derived therefrom. For example the terms include, the halo-styrenes, e.g. chloro styrene the vinyl toluenes, t-butylstyrene, compounds of the alpha-methyl styrene type, and polymers derived therefrom.

The invention is further illustrated by reference to the following examples in which the parts, unless otherwise stated, are parts by weight.

EXAMPLE I

The composition appearing in the following table were blended together in a Banbury mixer.

|  | EXAMPLE 1 | COMPARATIVE COMPOSITIONS | | |
|---|---|---|---|---|
|  |  | A | B | C |
| Homopolystyrene[1] (parts) | 62.0 | 62.0 | — | — |
| Toughened polystyrene (parts) | 26.5[2] | 26.5[2] | 100[3] | 100[3] |
| Block copolymer[4] (parts) | 11.5 | 11.5 | — | — |
| Antistat[5] (parts) | 1.8 | — | 1.8 | — |

[1]: a commercially available heat-resistant crystal polystyrene such as CARINEX HR obtainable from Shell Chemicals UK Limited.
[2]: a toughened polystyrene obtained by interpolymerization, i.e. graft copolymerization of styrene and butadiene rubber (7% by weight) in the presence of 12% white petroleum jelly.
[3]: a commercially available grade of toughened polystyrene specially designed for producing thin-walled articles obtainable under the designation STYRON 456 from Dow Chemical Company and believed to be an interpolymer of styrene and butadiene rubber (about 7% weight).
[4]: a commercially available styrene-butadiene-styrene block copolymer CARIFLEX TR 1101 obtainable from Shell Chemicals UK Limited.
[5]: Ethylan MLD - a commercially available product from Lankro Chemicals Limited and believed to be lauric diethanolamide.

The above compositions were extruded into a toughened polystyrene sheet (20 thousands of an inch thick) by a Bridges NRM extruder and then the sheet was thermoformed into breakers by an Illig LDFG23 plug-assisted thermoforming machine. The sheet and the beakers were then tested for their antistatic properties by the following test method:

The specimens to be tested were conditioned in an atomsphere at 23°C and 50% relative humidity for 30 minutes. Each conditioned specimen was placed in a cabinet provided with two fans and a supply of a dust comprising a finely-divided mixture of pigments known as Fire Orange and Arc Chrome. The dust is blown on to the rotating blades of one fan by means of compressed air and this fan causes initial dispersion and maintains circulation of the dust in the cabinet. Approximately 1 gram of dust is used for each test and the dust is allowed to circulate for 5 minutes after which the fans are switched off. The dust is allowed to settle for 2 minutes before renewal of the specimen for inspection. Each specimen is viewed under a fluorescent lamp emitting 3,600 A and compared with the dust patterns existing on six standards which are numbered according to the following key:

| Dust Pattern | Standard |
| --- | --- |
| Negligible dust pick-up | 1 |
| Slight smudges only | 2 |
| Pronounced smudges only | 3 |
| Slight fern-leaf type patterns smudges and dots | 4 |
| Pronounced fern-leaf type patterns smudges and dots | 5 |
| Intense dust patterns | 6 |

Each specimen was therefore given a number according to the above key and it will be seen that "1" indicates excellent antistat properties and "6" indicates no antistat properties. The results of the test are given in the following table:

|  | 4-hour test | 24-hour test | 7-day test | Beakers |
| --- | --- | --- | --- | --- |
| Example 1 | 1 | 1 | 1 | 1 |
| Comparison A | 5–6 | 5–6 | 5–6 | 3–4 |
| Comparison B | 2–3 | 2–3 | 2 | 3 |
| Comparison C | 4 | 5 | 5 | 4 |

What is claimed is:

1. A toughened polystyrene composition having improved antistatic retention properties comprising a physical blend of
   a. from about 20 to about 95% by weight of a polystyrene homopolymer or of a toughened polystyrene obtained by polymerization of styrene monomer in the presence of an elastomer,
   b. from about 5 to about 40% by weight of a substantially uncross-linked elastomeric block copolymer having a general formula from the group consisting of $$(A - B)_n \text{ or } (A - B)_n - A$$

in which each A is a polymer block of a monovinyl aromatic hydrocarbon said block having an average molecular weight from about 5,000 to about 40,000 and B is a polymer block of a conjugated $C_4$–$C_6$ alkadiene having an average molecular weight from about 30,000 to about 200,000; n is a positive integer from 1 to 6; and
   c. from about 0.3 to about 5% by weight of a compatible antistatic agent selected from long chain aliphatic acid amides and alkylene oxide derivatives thereof.
2. An improved composition as in claim 1 wherein the antistatic agent is selected from $C_{8-20}$ aliphatic acid amides and ethylene oxide derivatives thereof.
3. An improved composition as in claim 2 wherein the antistatic agent is lauric diethanol amide.
4. An improved composition as in claim 1 wherein the component B is a styrene-butadiene-styrene block copolymer.
5. An improved composition as in claim 1 containing as an additional component homopolystyrene in a weight ratio of toughened polystyrene to homopolystyrene of 90:10 to 10:90, provided that the elastomeric block copolymer component (a) is not less than 5% by weight and that the antistatic agent component (c) is not less than 0.2% by weight.

* * * * *

UNITED STATES PATENT OFFICE
CERTIFICATE OF CORRECTION

PATENT NO. : 3,873,645
DATED : March 25, 1975
INVENTOR(S) : LESLIE A. MUIRHEAD and WILLIAM P. MILLRINE It is certified that error appears in the above-identified patent and that said Letters Patent are hereby corrected as shown below:

In the heading of the patent:

Assignee: Shell Oil Company, New York, N. Y.

Signed and Sealed this fourth Day of May 1976

[SEAL]

Attest:

RUTH C. MASON
*Attesting Officer*

C. MARSHALL DANN
*Commissioner of Patents and Trademarks*